United States Patent [19]

Asahara

[11] Patent Number: 5,109,759

[45] Date of Patent: May 5, 1992

[54] TOFU MAKING MACHINE

[76] Inventor: Toshio Asahara, 18-3 Shigino. nishi, 2-chome Jyoto-ku, Osaka-shi Osaka 536, Japan

[21] Appl. No.: 345,544

[22] PCT Filed: Jul. 28, 1988

[86] PCT No.: PCT/JP88/00763

§ 371 Date: Aug. 9, 1989

§ 102(e) Date: Aug. 9, 1989

[87] PCT Pub. No.: WO89/00818

PCT Pub. Date: Feb. 9, 1989

[30] Foreign Application Priority Data

Jul. 30, 1987 [JP] Japan .................. 62-117056[U]
Jul. 30, 1987 [JP] Japan .................. 62-117057[U]

[51] Int. Cl.$^5$ .................. A23L 1/20; A47J 19/00
[52] U.S. Cl. ...................... 99/483; 99/453; 99/484; 99/486; 99/511
[58] Field of Search .................. 99/325–327, 99/331–333, 348, 353, 452, 453, 456, 483, 484, 485, 486, 489, 511–513, 516, 568; 426/431, 464, 482, 486; 366/145, 146

[56] References Cited

U.S. PATENT DOCUMENTS

| 3,981,234 | 9/1976 | Nelson et al. | 99/483 |
| 4,076,851 | 2/1978 | Tunoda | 426/431 |
| 4,681,029 | 7/1987 | Bartesch et al. | 99/516 |
| 4,813,347 | 3/1989 | Yoshida | 99/453 |
| 4,817,516 | 4/1989 | Chikarashi | 99/484 |
| 4,869,164 | 9/1989 | Takeyama | 99/511 |
| 4,947,742 | 8/1990 | Nishibayashi | 99/484 |

Primary Examiner—Timothy F. Simone
Attorney, Agent, or Firm—Joseph C. Mason, Jr.; Ronald E. Smith; Cornell Cornish

[57] ABSTRACT

A material passage whose height decreases progressively towards the downstream side is formed and a hopper (1), a pulverizer (3), a centrifugal separator (4) and a soybean milk receiver (12) are disposed in that order in the downstream direction along the passage. Accordingly, tofu (soybean curd) can be made more readily and automatically. (2) Juice of pulverization prepared by crushing water-containing soybeans with a pulverizer (3) is put into a centrifugal separator (4) consisting of a cylindrical rotary basket (43) rotating on its axis so as to separate soybean milk and bean-curd refuse. To make the apparatus compact, the pulverizer (3) and the centrifugal separator (4) are disposed in a casing having the same space.

4 Claims, 5 Drawing Sheets

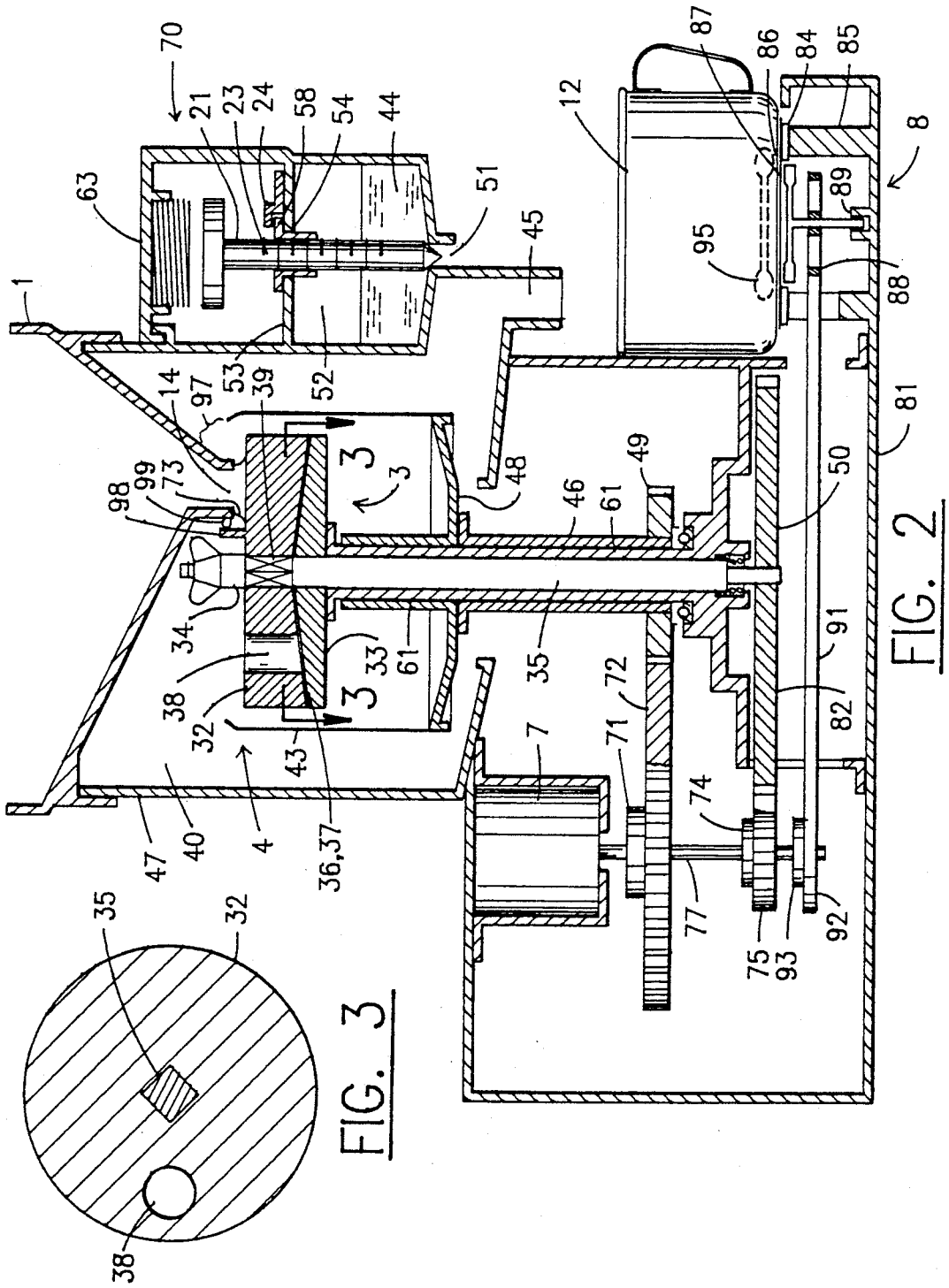

TOFU MAKING MACHINE

TECHNICAL FIELD

This invention relates to a tofu making machine, and more particularly to an automated but simple tofu making machine suitable for home use.

BACKGROUND ART

The known tofu making machines include a tofu making machine disclosed in, for example, Japanese Utility Model Laid-Open No. 124092/1976. This tofu making machine consists of a soybean milk squeezer 5 (FIG. 8) and an agitator 96 (FIG. 7) which are provided as entirely separate parts.

Referring now to FIGS. 7 and 8 in more detail, there it will be seen that the soybean milk squeezer is provided with a raw material storage hopper 1, and a water tank 2 adjacent to the hopper 1, and a pulverizer 3, a centrifugal separator 4 and a soybean milk receiver 12 in the mentioned order below the hopper 1 and water tank 2. An opening at the lower end of the hopper 1 and an upstream end portion of the pulverizer 3, which is disposed below the hopper 1, are connected together by a communication tube 10, and the communication tube 10 and water tank 2 are communicated with each other by a water feed tube 6.

The agitator 96 consists of an agitator body 11 holding the soybean milk receiver 12, and a cover 20. The agitator body 11 is provided with a heater 84 buried in the wall thereof, while the cover 20 has agitation blades 94, 94 adapted to be driven by an agitation motor 90 and projecting downward therefrom.

In this tofu making machine, soybeans, raw materials, are inserted into the hopper 1 with water placed in the water tank 2, and a driving switch (not shown) is closed. As a result, a motor 7 is started, so that the pulverizer 3 and centrifugal separator 4 begin to be rotated at predetermined speeds. The soybeans supplied to the hopper 1 are thereby sent with the water, which is injected from the water tank 2 into the communication tube 10, into the pulverizer 3, and these materials are crushed by pulverization propellers 9 in the pulverizer 3 and sent to the centrifugal separator 4, in which the pulverized materials are separated into soybean milk and bean-curd refuse.

The soybean milk produced by and discharged from the centrifugal separator 4 flows down from a soybean milk separating chamber 40 into the soybean milk receiver 12 and is stored therein.

The soybean milk receiver 12 is then taken out from the soybean milk squeezer 5, and bittern is added to the soybean milk in this soybean milk receiver 12. The resultant soybean milk receiver 12 is transferred to the agitator 96, in which the agitation blades 94 are operated for a predetermined period of time as the soybean milk is heated by the heater 84, the soybean milk being then left as it is to complete the tofu making operation.

This tofu making machine, in which the hopper 1, pulverizer 3, centrifugal separator 4 and soybean milk receiver 12 are arranged vertically, is advantageous in that the step of supplying soybeans to the hopper 1 through the step of dropping soybean milk into the soybean milk receiver 12 can be automated.

However, this conventional tofu making machine is not capable of sufficiently simplifying the tofu making operation.

The reasons why such an inconvenience occurs reside in the following. In this conventional tofu making machine, a series of steps of crushing water-containing soybeans in the pulverizer 3, separating soybean milk from bean-curd refuse in the centrifugal separator 4, and storing the resultant soybean milk in the soybean milk receiver 12 are automated but the transferring of the soybean milk receiver 12, which was taken out from the soybean milk squeezer 5, to the agitator 96, the adding of bittern to the soybean milk, the starting and stopping of the agitator and the energizing and deenergizing of the heater 84, which constitute the greater part of a tofu making operation, have to be carried out manually.

The prior art, when considered as a whole, neither teaches nor suggests to one of ordinary skill in this art how the tofu-making operation could be automated, nor does it suggest how the tofu-making machine of the prior art could be miniaturized.

DISCLOSURE OF INVENTION

The novel machine is designed so that tofu is made automatically by merely charging soybeans, raw materials, and water into a hopper, and pushing a button. A first timer ensures that the soybeans will thoroughly soak in the water before exiting the hopper. When the soaking period is over, a valve opens and the soaked soybeans exit the hopper through a downspout under the influence of gravity. Said soaked beans enter a pulverizer which begins operation at the end of the soaking period. The pulverizer is positioned within the open-topped cavity of a basket-shaped centrifugal separator for separating the pulverized water-containing soybeans into soybean milk and beancurd refuse. Soybean milk overflows the separator after the pulverized and separator have operated for a period of time, and said milk enters into the housing. It is then drained from the housing into a soybean milk receiver or container positioned therebelow. A valved bittern storage chamber is positioned above the receiver and a valve under the control of a timer opens to admit a predetermined quantity of bittern into the milk. An agitator for stirring the milk in the receiver and a heater for heating said milk are also activated when the bittern valve is opened. Timing means are also employed to close the bittern valve, deactivate the agitator and heater, and reset the machine.

The primary object of this machine is to provide a simple but automated tofu-making machine that is suitable for home use.

A more specific object is to provide a small tofu-making machine that automates every step of the process except the charging of soybeans into a hopper and the pushing of a button to start the machine.

These and other important objects, advantages, and features of the invention will become apparent as this description proceeds. The invention accordingly comprises the features of construction, combination of elements and arrangements of parts that will be exemplified in the construction set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a sectional view of the preferred embodiment of the present invention;

FIG. 3 is a sectional view taken along line 3—3 in FIG. 2;

Similar reference numerals refer to similar parts throughout the several view of the drawings.

BEST MODES FOR CARRYING OUT THE INVENTION

Figure 1:
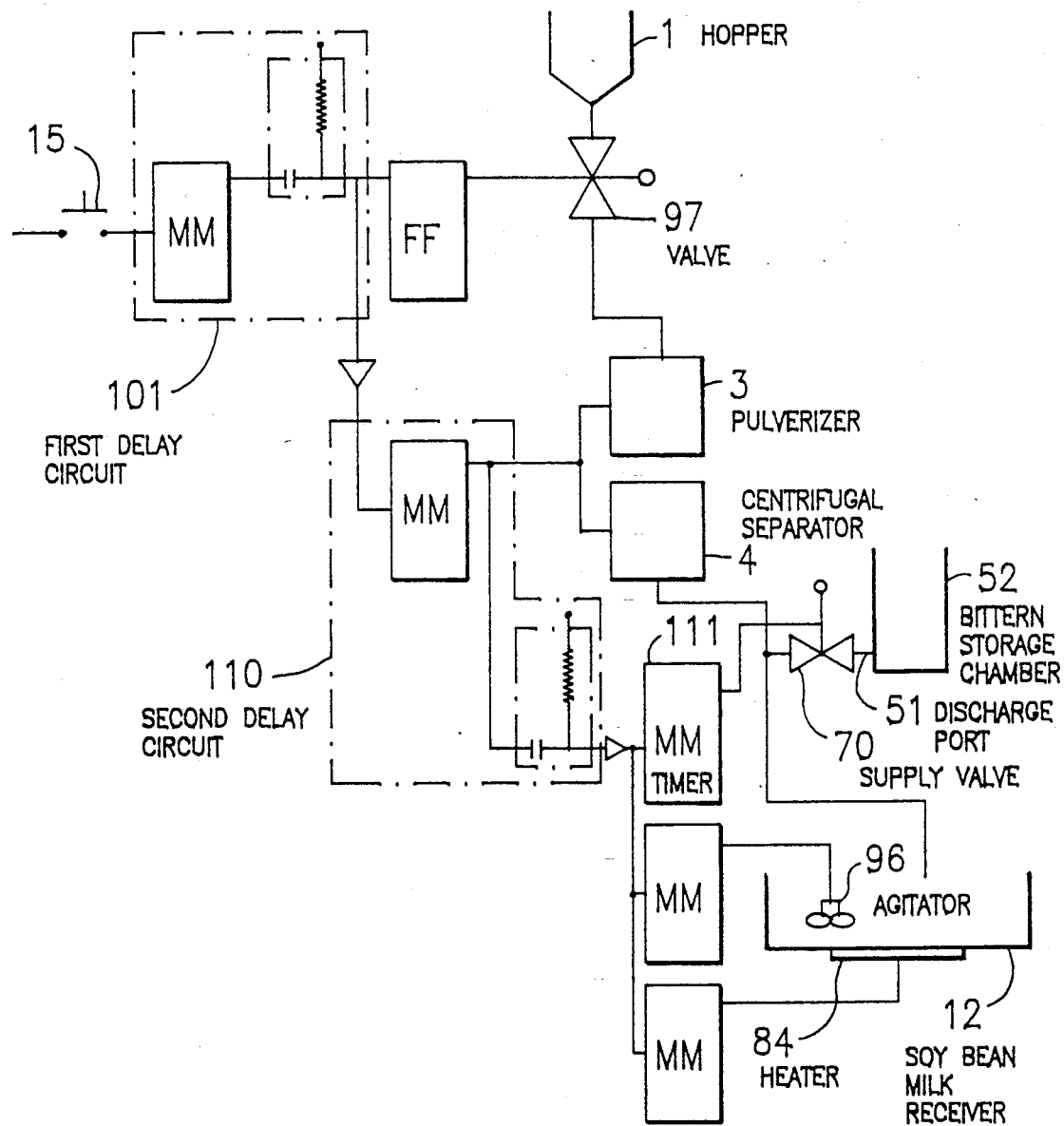
FIG. 1 is a schematic diagram of the present invention.

Referring now to FIGS. 1 and 2, reference numeral 1 denotes a hopper, 3 a pulverizer, 4 a centrifugal separator, 12 a soybean milk receiver, 15 a start switch, 32 a first grinder, 33 a second grinder, 35 a rotary shaft, 43 a rotary basket, 46 a cylindrical shaft, 51 a discharge port, 52 a bittern storage chamber, 70 a bittern supply valve, 84 a heater, 96 an agitator, 97 a valve, 101 a first delay circuit, 110 a second delay circuit, and 111 a timer.

More particularly, the present tofu-making machine includes a valve 97 installed in a flow passage between hopper 1 and pulverizer 3, a bittern storage chamber 52 positioned above a soybean milk receiver 12 and connected at its discharge port 51 to the soybean milk receiver 12, a bittern supply valve 70 adapted to open and close the discharge port 51, a first delay circuit 101 adapted to receive a first signal upon closing of start switch 15, by which the machine is started, and output a second signal for opening the valve 97 and signals for starting the pulverizer 3 and centrifugal separator 4, a second delay circuit 110 adapted to receive an output from the first delay circuit 101, and a timer 111 adapted to receive a delayed output from the second delay circuit 110 and output for a predetermined period of time a signal for opening the bittern supply valve 70, the agitator 96 and soybean milk heater 84 being operated for a predetermined period of time when they receive a time-out signal from the timer 111 or an output from the second delay circuit 110, the pulverizer 3 (FIG. 2) consisting of a mill composed of two vertically stacked rotary grinders 32, 33, a rotary shaft 35 (FIG. 3) being fitted in the central portion of the pulverizer 3 so that the rotary shaft 35 is joined to one rotary grinder alone in a rotation preventing state, a cylindrical haft 46 downwardly extending from the lower surface of a rotary basket 43 constituting the centrifugal separator 4, the rotary shaft 35 for the pulverizer 3 being inserted in the cylindrical shaft 46, the pulverizer 3 being disposed within the centrifugal separator 4, the rotary shaft 35 for the pulverizer 3 and the cylindrical shaft 46 for the centrifugal separator 4 being selectively connectable to a driving power source consisting of a motor, whereby these shafts 35, 46 are rotated independently of each other.

The operation of the above technical means will now be described on the basis of a practical tofu making process.

First, soybeans and water, raw materials, are placed in the hopper 1, and the start switch 15 is closed.

When the start switch 15 is closed, a first signal is applied to the first delay circuit 101. These soybeans are left soaked in the water in the hopper 1 until a delay signal has been outputted from the first delay circuit 101. While the soybeans are left in this manner, the water infiltrates thereinto, and the swelling of the soybeans progresses naturally.

When the time set on the first delay circuit 101 has elapsed with the water sufficiently infiltrating into the soybeans, a signal is outputted from the first delay circuit 101, whereby the valve 97 inserted between the pulverizer 3 and hopper 1 is opened with the pulverizer 3 started. Consequently, the water-containing soybeans in the hopper 1 are supplied to the pulverizer 3 via the opened valve 97, and crushed therein.

Juice of pulverization of the soybeans crushed in the pulverizer 3 is sent to the centrifugal separator 4, which is started by an output signal from the first delay circuit 101, and separated therein into bean-curd refuse and soybean milk, the soybean milk thus separated flowing into the soybean milk receiver 12 provided on the downstream side of the centrifugal separator 4.

The output from the first delay circuit 101 is applied to the second delay circuit 110. Accordingly, after a signal has been outputted from the first delay circuit 101, the crushing of the soybeans by the pulverizer 3 and the separation of the soybean milk by the centrifugal separator 4 have been completely finished, and the soybean milk is discharged to the soybean milk receiver 12, a signal is thereafter outputted from the second delay circuit 110.

When a signal has been outputted from the second delay circuit 110, it is applied to a timer 111, from which a signal is outputted for a predetermined period of time. While this signal is outputted, the bittern supply valve 70 is kept opened.

When the bittern supply valve 70 has been opened, the discharge port 51 of the bittern storage chamber 52 is allowed to communicate with the soybean milk receiver 12, so that the bittern stored in the chamber 52 is added to the soybean milk in the soybean milk receiver 12. When the quantity of the bittern added to the soybean milk has reached a predetermined level, the bittern supply valve 70 is closed again by a time-out signal from the timer 111.

The agitator 96 and heater 84 are adapted to receive a time-out signal from the timer 111, or a signal from the second delay circuit by which the timer 111 is started, and to be operated for a predetermined period of time. Accordingly, the soybean milk is heated by the heater 84 for a predetermined period of time as it is stirred by the agitator 96, simultaneously with or after the completion of the bittern adding operation, the machine as a whole being thereafter stopped.

Tofu is obtained after the agitated soybean milk has been allowed to age for a predetermined period of time.

The present invention has the following special effects.

Since all of a series of steps from the step of impregnating raw soybeans with water to the step of agitating the soybean milk while heating the same can be carried out automatically, a tofu making operation can be carried out by merely setting soybeans and water in the hopper 1.

As shown in FIG. 2, the pulverizer 3 is housed in the rotary basket 43 of the centrifugal separator 4 so that the pulverizer 3 and centrifugal separator 4 are positioned in the same portion of the space in the casing of the machine. Therefore, the tofu making machine can be miniaturized as compared with a conventional tofu making machine of this kind which requires a larger inner space due to its separately arranged pulverizer and centrifugal separator.

As shown in FIG. 2, a hopper 1 is removably set on the upper portion of a soybean milk separating chamber 40, and a centrifugal separator 4 is provided in the interior of the same chamber 40.

Figure 5:
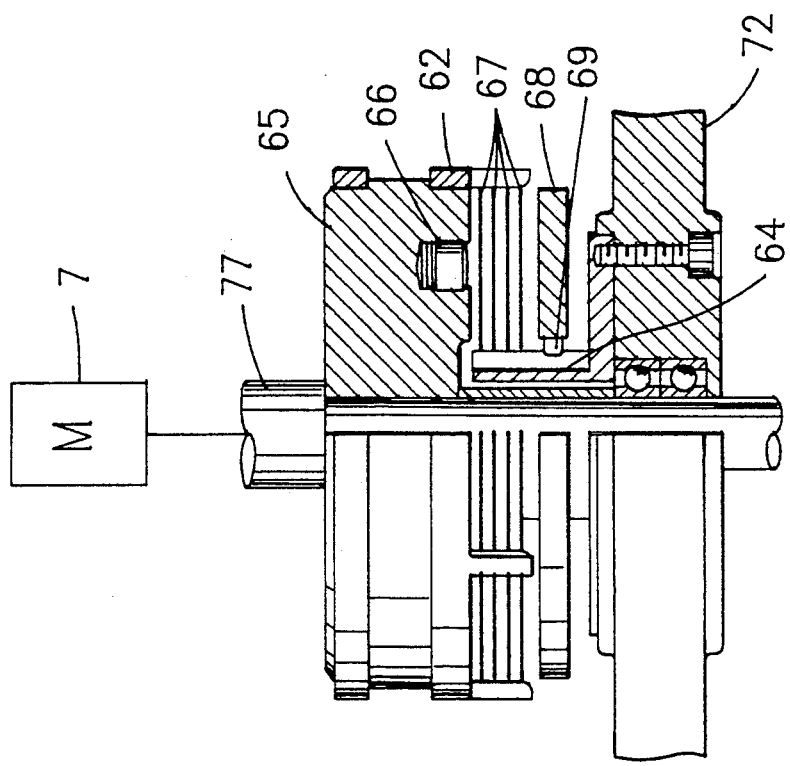
FIG. 5 is a partially sectional view of a clutch mechanism mounted on an output shaft.
Figure 4:
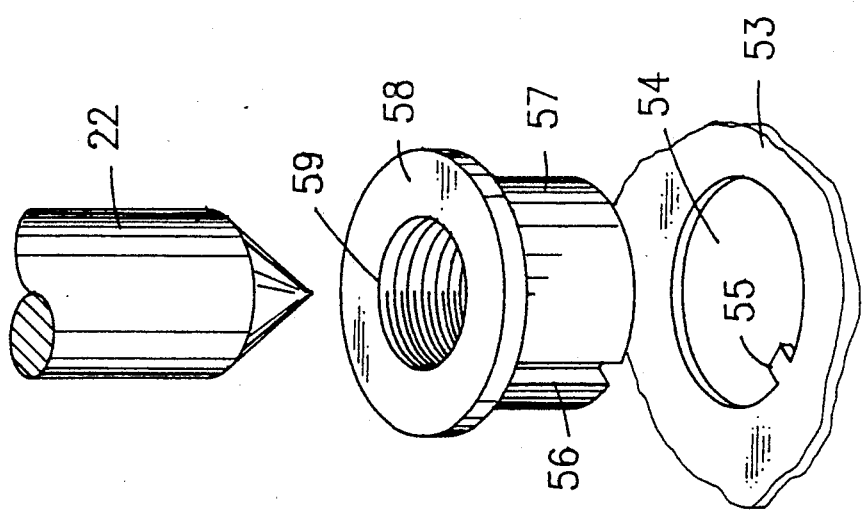
FIG. 4 is an exploded perspective view of a needle valve.
Figure 6:
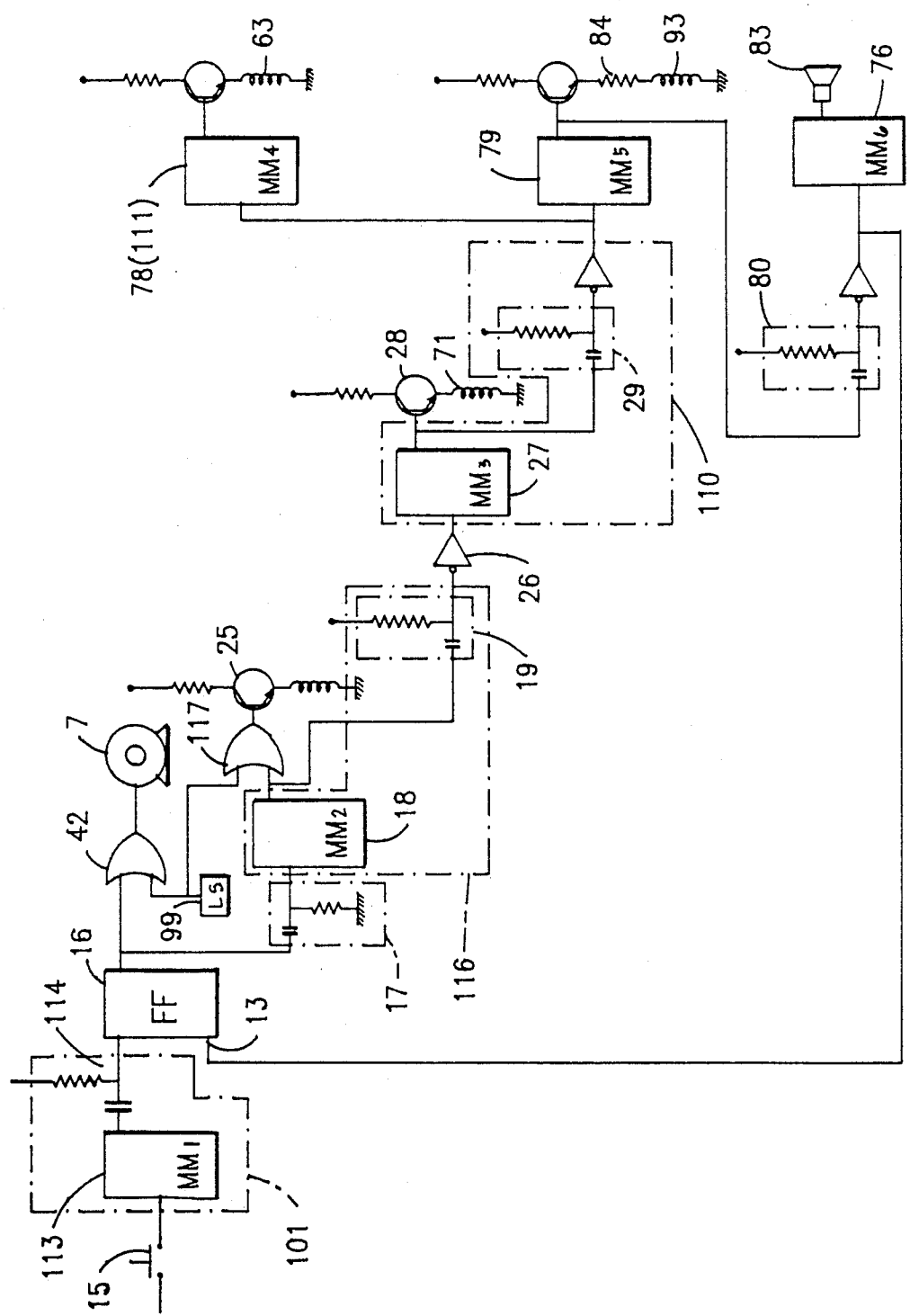
FIG. 6 is an electric circuit diagram.
Figure 8:
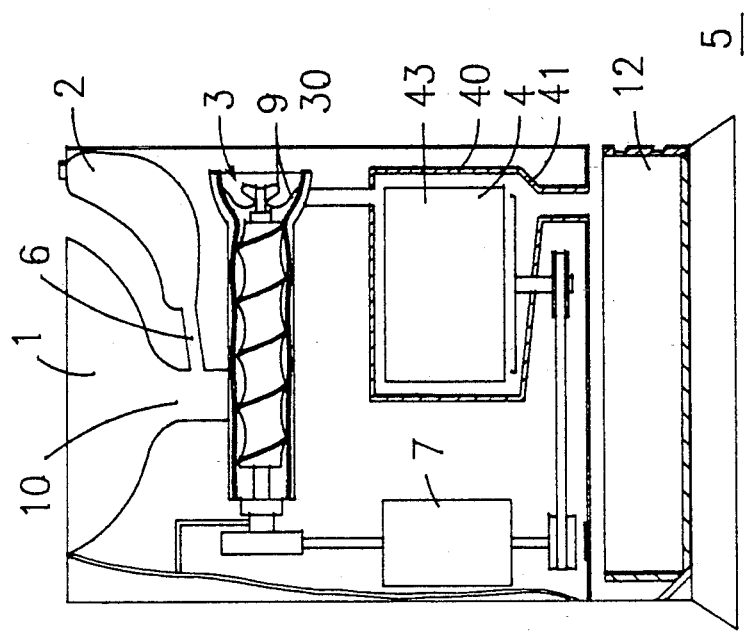
FIG. 8 a side elevational, broken away view of a prior art tofu-making machine.
Figure 7:
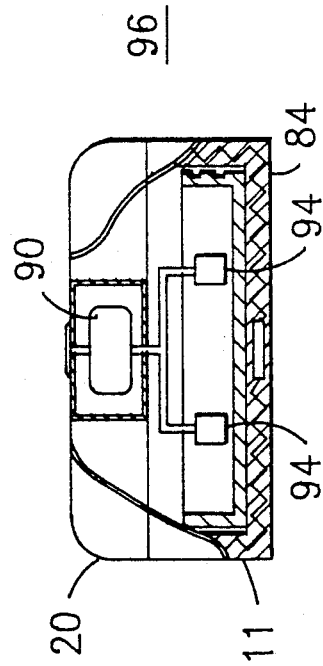
FIG. 7 is a side elevational, broken away view of a prior art agitator.

The centrifugal separator 4 consists of a small-mesh cylindrical rotary basket 43, and a cylindrical shaft 46 extending downward from the central portion of a bottom plate 48 of the rotary basket 43, and a first gear 49 mounted on the lower end portion of the cylindrical shaft 46 is meshed with a second gear 72. The second gear 72 is connected to an output shaft of a motor 7 via a first electromagnetic clutch 71. The first electromagnetic clutch 71 consists as shown in FIG. 5 of a magnet 65 mounted fixedly on the output shaft 77 of the motor 7, an outer driver 62 fitted fixedly around the outer circumferential surface of the magnet 65, an electromagnetic coil 66 provided in a recess in the magnet 65, ring type friction plates 67, 67, a slide ring 68 opposed to the magnet 65 via these friction plates 67, 67, and a driven cylinder 64 engaged with a projection 69 on the inner circumferential surface of the slide ring 68 and fixed to the second gear 72. When the electromagnetic coil 66 is excited, a magnetic force occurs, by which the slide ring 68 is attracted toward the magnet 65, so that the friction plates 67, 67 are pressed against one another. Consequently, the rotary torque of the motor 7 is transmitted to the magnet 65, outer driver 62, friction plates 67, 67, driven cylinder 64 and second gear 72 in the mentioned order.

Referring again to FIG. 2, the rotary basket 43 constituting the centrifugal separator 4 is provided therein with a pulverizer 3, which consists of a first disc type rotary grinder 32, and a second rotary grinder 33, which are vertically stacked. These first and second rotary grinders 32, 33 are provided in their contact surfaces with radial grooves 36, 37, which extend from the centers of these contact surfaces to the outer circumferences thereof, so as to conveniently pulverize the soybeans and send out the pulverized soybeans to the outer circumferences of the same contact surfaces. The first rotary grinder 32 is provided with a through hole 38 extending from the upper surface thereof to the lower surface thereof, and this through hole 38 is opposed to an opening 14 at the lower end of the hopper 1 from the lower side thereof.

A rotary shaft 35 is passed through the central portion of the pulverizer 3, and provided with a male screw 34 at the upper end portion thereof. The portion of the rotary shaft 35 which is on the lower side of and adjacent to this externally threaded screw 34 is formed polygonally in cross section over a predetermined length, and this polygonal region 39 is fitted in the upper first grinder 32, which constitutes a part of the pulverizer 3, so as to prevent the grinder 32 from being rotated.

The rotary shaft 35 is inserted loosely in a cylindrical support post 61 which is fixed to the central portion of the lower surface of the lower second grinder 33, which constitutes the other part of the pulverizer 3, so as to extend downward. The cylindrical support post 61 is inserted loosely in the cylindrical shaft 46 for the centrifugal separator 4, and fixed at its lower end to a base 82 fastened to an outer case 81 of the machine 8. The lower end of the rotary shaft 35 inserted in the cylindrical support post 61 projects from the lower surface of the base 82 on the outer case 81, and a third gear 50 is mounted firmly on this projecting portion of the rotary shaft 35. The third gear 50 is meshed with a fourth gear 75 mounted on the output shaft of the motor 7 via a second clutch 74 having the same construction as the first electromagnetic clutch 71.

The soybean milk separating chamber 40, in which the centrifugal separator 4 and pulverizer 3 are housed, is provided at the lower end portion thereof with a discharge passage 45 opened above an upper opening of a soybean receiver 12, which is placed on an annular heater 84 on the upper surface of a wall 85 standing up on the bottom surface of the outer case of the machine 8.

A driving vane 87 of a magnet stirrer is positioned in a central bore 86 in the annular heater 84 and mounted on a rotary shaft 89 on which a second pulley 88 is also mounted. The second pulley 88 is connected to a first pulley 92 via a V-belt 91, and the first pulley 92 to the output shaft 77 of the motor 7 via a third magnetic clutch 93.

Finally, a bittern storage chamber 52 filled with bittern is formed above the soybean milk receiver 12, and provided in its upper wall 53 with a through hole 54, in which a needle valve 21 is fitted so that the needle valve 21 can be vertically moved. As shown in FIG. 11, a vertically extending rib 55 projects radially inwardly from a predetermined portion of the inner circumferential surface of the through bore 54 made in the upper wall 53, and a lift cylinder 57 having a groove 56 loosely engageable with the rib 55 and vertically extending in the outer surface thereof is fitted in the through bore 54. This lift cylinder 57 is provided at the outer circumference of an upper end portion thereof with a circular flange 58, by which the falling of the lift cylinder 57 fitted in the through bore 54 is prevented. The lift cylinder 57 is further provided on the inner circumferential surface thereof with a female thread 59, with which external threads 23 formed on an intermediate portion of a valve stem 22 of the needle valve 21 and used to regulate the degree of opening of the same valve is engaged.

A stopper 24 (FIG. 2) for controlling the quantity of an upward movement of the needle valve 21 is provided on the upper surface of the upper wall 53 of the bittern storage chamber 52. An electromagnet 63 is positioned above the needle valve 21, and adapted to attract the needle valve 21 upward when the needle valve 21 is to be opened.

The motor 7 and first electromagnetic clutch 71 are electrically arranged as shown in the electric circuit of FIG. 13.

An output from a start switch 15 is applied to a first flip-flop (which will hereinafter be referred to as first FF) 16, and the motor 7 is adapted to be driven by an output from the first FF 16.

An output from the first FF 16 is applied to a first monovibrator (which will hereinafter be referred to as first MM) 18 through a first differentiating circuit 17. An output from the first MM 18 is applied to the base of a first transistor 25, which is adapted to drive a second clutch 74, and also to a second monovibrator (which will hereinafter be referred to as second MM) 27 through a second differentiating circuit 19 and a first inversion circuit 26. An output from the second MM 27 is applied to the base of a second transistor 28, which is adapted to turn on and off a first electromagnetic clutch 71, and a third differentiating circuit 29, and an inverted output from the third differentiating circuit 29 to a third monomultivibrator (which will hereinafter be referred to as third MM) 78, which is adapted to turn on and off the electromagnet 63, and a fourth monomultivibrator (which will hereinafter be referred to as fourth MM) 79, which is adapted to turn on and off the third electromagnetic clutch 93. An output from the fourth MM 79 is applied to a fourth differentiating circuit 80, and an inverted output from the fourth differentiating circuit 80 to a fifth monomultivibrator (which will hereinafter be referred to as fifth MM) 76, which is adapted to turn on and off a buzzer 83 for reporting the completion of an operation, and a reset input terminal 13 of the first FF 16.

The practical use of the above embodiment of the tofu making machine according to the present invention will now be described.

The water-impregnated soybeans are prepared and they are placed in the hopper 1. When the start switch 15 is closed, the first FF 16 outputs a first signal and the motor 7 starts rotating.

Concurrently with the starting of rotation of the motor 7, a rising part of an output from the first FF 16 is detected by the first differentiating circuit 17, so that the first MM starts operating and outputs a second signal for such a period of time that was set therein. Consequently, the first transistor 25 is turned on with the second clutch 74 engaged for a predetermined period of time, to rotate the rotary shaft 35, which is adapted to drive the pulverizer 3, via the fourth and third gears 75, 50, whereby the first rotary grinder 32, which is mounted firmly on the upper end portion of the rotary shaft 35, starts rotating for the mentioned predetermined period of time. During the time of rotation of the first rotary grinder 32, the water-containing soybeans supplied from the hopper 1 are fed from the through hole 38 in the first rotary grinder 32 onto the frictional surfaces of the first and second rotary grinders 32, 33, on which the soybeans are pulverized. The juice (soybean milk and tofu refuse) thus produced is discharged from the outer circumferential edge of the pulverizer into the centrifugal separator 4.

At around the time at which all the water-containing soybeans in the hopper 1 have been pulverized, the time set in the first MM 18 elapses. As a result, the level of an output from the first MM 18 returns to "L" to cause the second clutch 74 to be disengaged.

When the level of an output from the first MM 18 has fallen to "L", this signal change is picked up by the second differentiating circuit 19 to turn on the second MM 27, which thereby engages the first electromagnetic clutch 71 for such a period of time that was set in the second MM 27.

Consequently, the rotation of the output shaft 77 of the motor 7 is transmitted to the cylindrical shaft 46, which supports the rotary basket 43 constituting the centrifugal separator 4, via the second and first gears 72, 49 to cause the rotary basket 43 to be rotated. As a result, the soybean milk is separated from the liquid mixture of pulverized soybeans in the basket 43 and supplied from the bottom wall of the soybean milk separating chamber 40 to the soybean milk receiver 12 through the discharge passage 45.

When the centrifugal separator 4 has been operated for such a period of time that was set in the second MM 27, with all of the separated soybean milk discharged to the soybean milk receiver 12, the level of an output signal from the second MM changes from "H" to "L". Consequently, the first electromagnetic clutch 71 is disengaged and the centrifugal separator 4 is stopped. The change of this output level is detected by the third differentiating circuit 29 to turn on the third and fourth MM 78, 79.

When the third MM 78 is turned on, the electromagnet 63 is excited to lift the needle valve 21, so that a clearance occurs between the lower end of the needle valve 21 and the opening 51 at the lower end of the bittern storage chamber 52 to cause the bittern 44 held in the bittern storage chamber 52 to fall into the soybean milk in the soybean receiver 12. When the period of time set in the third MM 78 has elapsed, the electromagnet 63 is deexcited, so that the needle valve 21 falls by weight to stop the supplying of the bittern into the soybean milk.

On the other hand, since an output from the fourth MM 79 which is turned on simultaneously with the energization of the third MM 78 is also applied to the third electromagnetic clutch 93, this clutch 93 is engaged and the first pulley 92 is rotated. The rotational force of the first pulley 92 is transmitted to the second pulley 88, which is adapted to drive the magnet stirrer, via the V-belt 91 to cause the driving vane 87 to be rotated. Consequently, the driven vane 95 placed with the soybean milk in the soybean receiver 12 is rotated to start agitating the soybean milk. Owing to the energization of the fourth MM, the annular heater 84 is also turned on, so that the agitation of the soybean milk is continued with the soybean milk 12 heated to around 70° C.

When the time set in the fourth MM 79 has then elapsed, so that an output of "L" is outputted therefrom, this output is detected by the fourth differentiating circuit 80, and the detected signal is applied to the fifth MM 76 and reset input terminal 13 of the first FF 16. Consequently, the buzzer 83 informing the completion of an operation is operated, and the first FF 16 is reset to cause the motor 7 to stop. Thus, the machine as a whole returns to an initial operational operation.

The soybean milk in the soybean milk receiver 12 is then transferred to a mold and aged for a predetermined period of time to complete the tofu making operation.

This invention is clearly new and useful. Moreover, it was not obvious to those of ordinary skill in the art at the time it was made, in view of the prior art when considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

I claim:

1. A tofu-making machine, comprising:
   a hopper into which is charged a predetermined quantity of soybeans and water;
   said hopper being funnel-shaped and having a downspout;

a pulverizer for pulverizing soybeans, said pulverizer changing said soybeans into a juice including soybean milk and soybean refuse;

said pulverizer positioned below said downspout;

a flow passage disposed in communicating relation between said downspout and said pulverizer;

a first valve positioned in said flow passage so that soybeans are gravity fed from said hopper into said pulverizer only when said first valve is open;

a switch means that generates a first signal when said switch means is activated;

a first time delay circuit in electrical communication with said switch means and said first valve, said first time delay circuit being activated by said first signal and said first time delay circuit generating a second signal to open said first valve upon the elapse of a first predetermined period of time that begins when said machine is activated, soybeans charged into said hopper soaking in said water until said first valve is opened;

said first time delay circuit further being in electrical communication with said pulverizer and said pulverizer being started upon receipt of said second signal;

a centrifugal separator having a basket-like configuration, said separator being rotatably mounted for rotation about a vertical axis;

said pulverizer being positioned within said centrifugal separator to save space;

said first time delay circuit further being in electrical communication with said centrifugal separator and said centrifugal separator being started upon receipt of said second signal;

said separator, when activated, separating said soybean milk and soybean refuse from one another;

a housing that houses said separator;

said housing having a downspout;

a soybean milk receiver positioned below said housing in open communication with said housing downspout so that soybean milk that overflows said separator and that therefore enters said housing is directed into said soybean milk receiver by said housing downspout under the influence of gravity;

a bittern storage chamber positioned above said soybean milk receiver, said storage chamber having a discharge spout disposed in open communication with said soybean milk receiver;

a second valve disposed in said storage chamber discharge spout;

a second time delay circuit in electrical communication with said first time delay circuit;

said second time delay circuit operative to measure a second predetermined period of time and to generate a third signal upon elapse of said second period of time, said pulverizer and said separator operating during said second period of time;

a timer in electrical communication with said second time delay circuit, said timer, when activated by said third signal, generating a fourth signal that opens said second valve for a third predetermined period of time and said timer generating a fifth signal that closes said second valve upon the elapse of said third predetermined period of time so that a predetermined quantity of bittern is charged into the soybean milk in said soybean milk receiver;

an agitator disposed in said soybean milk receiver for stirring said soybean milk;

a heater disposed in heat transfer relation to said soybean milk receiver;

said fourth signal activating said agitator and said heater for a fourth predetermined period of time and said timer generating a sixth signal that terminates operation of said agitator and heater upon the elapse of said fourth period of time.

2. A tofu-making machine, comprising:

a hopper into which is charged a predetermined quantity of soybeans and water;

said hopper being funnel-shaped and having a downspout;

a pulverizer for pulverizing soybeans, said pulverizer changing said soybeans into a juice including soybean milk and soybean refuse;

said pulverizer positioned below said downspout;

a flow passage disposed in communicating relation between said downspout and said pulverizer;

a first valve positioned in said flow passage so that soybeans are gravity fed from said hopper into said pulverizer only when said first valve is open;

a switch means that generates a first signal when said switch means is activated;

a first time delay circuit in electrical communication with said switch means and said first valve, said first time delay circuit being activated by said first signal and said first time delay circuit generating a second signal to open said first valve upon the elapse of a first predetermined period of time that begins when said machine is activated, soybeans charged into said hopper soaking in said water until said first valve is opened;

said first time delay circuit further being in electrical communication with said pulverizer and said pulverizer being started upon receipt of said second signal;

a centrifugal separator having a basket-like configuration, said separator being rotatably mounted for rotation about a vertical axis;

said pulverizer being positioned within said centrifugal separator to save space;

said first time delay circuit further being in electrical communication with said centrifugal separator and said centrifugal separator being started upon receipt of said second signal;

said separator, when activated, separating said soybean milk and soybean refuse from one another;

a housing that houses said separator;

said housing having a downspout;

a soybean milk receiver positioned below said housing in open communication with said housing downspout so that soybean milk that overflows said separator and that therefore enters said housing is directed into said soybean milk receiver by said housing downspout under the influence of gravity;

a bittern storage chamber positioned above said soybean milk receiver, said storage chamber having a discharge spout disposed in open communication with said soybean milk receiver;

a second valve disposed in said storage chamber discharge spout;

a second time delay circuit in electrical communication with said first time delay circuit;

said second time delay circuit operative to measure a second predetermined period of time and to generate a third signal upon elapse of said second period of time, said pulverizer and said separator operating during said second period of time;

a timer in electrical communication with said second time delay circuit, said timer, when activated by said third signal, generating a fourth signal that opens said second valve for a third predetermined period of time and said timer generating a fifth signal that closes said second valve upon the elapse of said third predetermined period of time so that a predetermined quantity of bittern is charged into the soybean milk in said soybean milk receiver;

an agitator disposed in said soybean milk receiver for stirring said soybean milk;

a heater disposed in heat transfer relation to said soybean milk receiver;

said fourth signal activating said agitator and said heater for a fourth predetermined period of time and said second time delay circuit generating a sixth signal that terminates operation of said agitator and heater upon the elapse of said fourth period of time.

3. The machine of claim 1, wherein said pulverizer includes a pair of vertically stacked, rotatably mounted grinders that are rotatably independently of one another.

4. The machine of claim 2, wherein said pulverizer includes a pair of vertically stacked, rotatably mounted grinders that are rotatable independently of one another.

* * * * *